(12) United States Patent
Ku

(10) Patent No.: US 9,910,293 B2
(45) Date of Patent: Mar. 6, 2018

(54) GLASSES WITH LEGS BENDABLE IN MULTIPLE ANGLES

(71) Applicant: Sun Hing Optical Manufactory Limited, Kowloon, Hong Kong (CN)

(72) Inventor: Otis Ngai-Yung Ku, Hong Kong (CN)

(73) Assignee: Sun Hing Optical Manufactory Limited, Kowloon, Hong Kong (CN)

( * ) Notice: Subject to any disclaimer, the term of this patent is extended or adjusted under 35 U.S.C. 154(b) by 0 days.

(21) Appl. No.: 15/073,784

(22) Filed: Mar. 18, 2016

(65) Prior Publication Data

US 2016/0341976 A1    Nov. 24, 2016

(30) Foreign Application Priority Data

May 22, 2015 (HK) ................... 15104898.8

(51) Int. Cl.
| | | |
|---|---|---|
| *G02C 5/14* | (2006.01) | |
| *G02C 5/20* | (2006.01) | |
| *G02C 5/22* | (2006.01) | |

(52) U.S. Cl.
CPC .............. *G02C 5/20* (2013.01); *G02C 5/143* (2013.01); *G02C 5/22* (2013.01)

(58) Field of Classification Search
CPC ............. G02C 5/20; G02C 5/143; G02C 5/22
USPC .......................................... 359/123, 111, 41
See application file for complete search history.

(56) References Cited

U.S. PATENT DOCUMENTS

| | | | |
|---|---|---|---|
| 509,967 | A | 5/1893 | Sumner |
| 4,652,098 | A | 3/1987 | Anger |
| 6,293,673 | B1 | 9/2001 | Hirschman et al. |
| 2009/0190088 | A1* | 7/2009 | Strobel ................. G02C 5/006 351/63 |

FOREIGN PATENT DOCUMENTS

| | | |
|---|---|---|
| CN | 1208472 | 2/1999 |
| CN | 1331427 | 1/2002 |
| CN | 201081772 | 7/2008 |
| CN | 202563181 | 11/2012 |
| CN | 2927097 | 10/2013 |
| CN | 204989659 | 1/2016 |

OTHER PUBLICATIONS

PCT Search Report.
Hong Kong Search Report.
English Translation of Aibing, CN202563181.

* cited by examiner

*Primary Examiner* — Tuyen Tra
(74) *Attorney, Agent, or Firm* — Alix, Yale & Ristas, LLP

(57) ABSTRACT

Eyeglasses with legs bendable in multiple angles, comprise a main glasses leg, a secondary glasses leg, an elastic body, a slider, and a connecting member. The secondary glasses leg may be hinged on the tail of the main glasses leg in such a manner that the opening angle may be locked, so that the user can conveniently and optionally open or change the bending angle of the tail of the glasses legs, so as to achieve optimal adaption for various occasions.

9 Claims, 3 Drawing Sheets

GLASSES WITH LEGS BENDABLE IN MULTIPLE ANGLES

TECHNICAL FIELD

The present disclosure relates to a type of eyeglasses, particularly to eyeglasses with legs bendable in multiple angles.

BACKGROUND ART

Generally, the tail of the glasses legs of eyeglasses bends at small angles, and the eyeglasses will not fall off when worn in normal circumstances. However, eyeglasses will fall off when wearers do heavy exercises or sweat significantly, so it is common for some people to tie a string or band which extends at the back of the head or to purchase mated glasses legs having a larger bending angle, which is expensive and inconvenient. Hence, eyeglasses having glasses legs bendable in multiple angles are desirable for many circumstances. They can meet the owner's requirements for relaxation and activity in daily life. They can be bendable at the tail of the glasses legs so as to engage tightly to the flap of the ears and prevent slipping off during exercises, and the user can open or engage them freely as desired.

SUMMARY

Eyeglasses are provided with legs bendable in multiple angles, which can be set with various bending angles in such a manner that an opening angle is lockable according to the user's needs, so as to open or bend the tail of the glasses legs. In addition, this kind of eyeglasses is efficient in structure.

Eyeglasses with legs bendable in multiple angles comprise a main glasses leg, a secondary glasses leg, an elastic body, a slider, and a connecting member, and are characterized in that the secondary glasses leg may be hinged to the tail of the main glasses leg in such a manner that the opening angle is lockable.

Preferably, a cavity for accommodating the elastic body and the slider is provided at a tail of the main glasses leg. The slider and the secondary glasses leg are each provided with enagable teeth at a position where they abut against each other. Optionally, the engaged portions of the slider with the secondary glasses leg may be mutually displaced. That is, a cavity for accommodating the elastic body and the slider is provided in a front portion of the second glasses leg. The slider and the main glasses leg are each provided with engagable teeth at a position where they abut against each other.

Preferably, the secondary glasses leg is partially or entirely arranged in the cavity of the main glasses leg.

Preferably, the main glasses leg is an anterior half of the glasses leg, and the secondary glasses leg is a posterior half of the glasses leg. The main glasses leg and the secondary glasses leg are arranged in series. The secondary glasses leg is partially or entirely exposed outside the main glasses leg.

Preferably, the teeth of the slider may be single or multiple in number. The slider is in a "T" shape, or in a shape of a hollow or solid rectangular body, a cylinder or a polyhedron, wherein the slider comprises a butt block whose top end is provided with teeth, and a core bar which is a cylinder; and the elastic body is sleeved outside the core bar.

Optionally, the butt block of the "T"-shaped slider may be a cylinder or a polyhedron, and the core bar may be a polyhedron.

Optionally, the butt block of the slider is a rectangular cube with teeth, a variety of polyhedrons with teeth, or a cylinder with teeth; and the core bar may be various polyhedrons.

Preferably, the slider has a blind hole, and the elastic body is disposed in the blind hole; or the elastic body is disposed behind the slider.

Preferably, the connecting member is a pin, a screw or a rivet.

Preferably, a hinge head is formed at a position where the secondary glasses leg and the main glasses leg abut against each other. The hinge head is a flat member and has a hinge hole therein. The top end surface of the hinge head is provided with the teeth angularly disposed about the hole, wherein the surfaces at the two sides of the hinge head are planar or curved surfaces approximating a plane, in which a through hole perpendicular to the top end surface of the hinge head is provided.

The advantageous effects of the eyeglasses with legs bendable in multiple angles of the present application reside in the capability of bending the glasses leg in multiple angles or restoring it to the original position according to the user's needs, while being structurally efficient.

DETAILED DESCRIPTION

Specific embodiments of the subject eyeglasses are set forth below.

Figure 1:
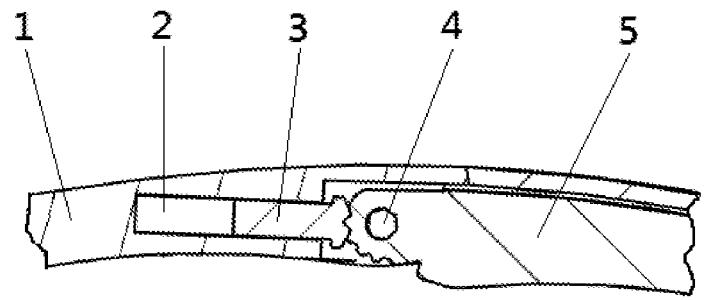
FIG. 1 is a schematic view of the internal structure of a first embodiment of the subject eyeglasses.
Figure 2:
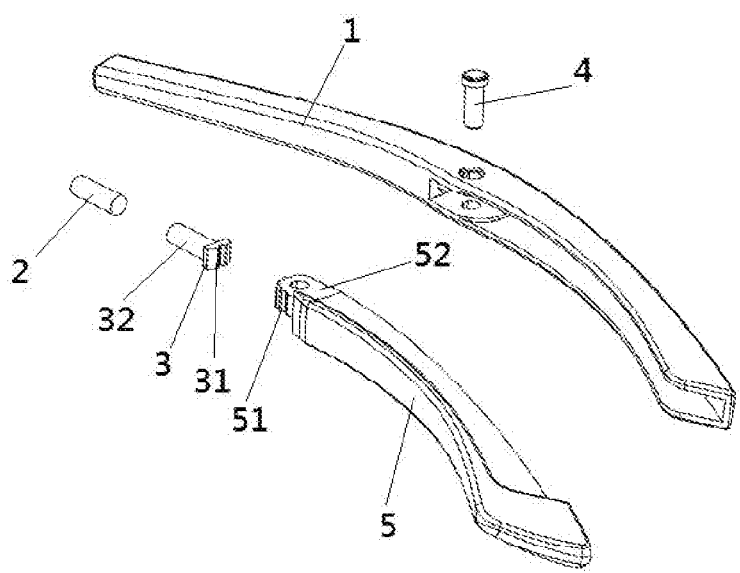
FIG. 2 is an exploded schematic view of the three-dimensional structure of the first embodiment of the subject eyeglasses.

Referring to FIGS. 1-2, eyeglasses with legs bendable in multiple angles of the present disclosure comprise a main glasses leg 1, an elastic body 2 (the elastic body of this embodiment is made of elastic plastic or rubber), a slider 3, a connecting body (which is a pin 4 in this embodiment) and a secondary glasses leg 5. The eyeglasses are characterized in that a cavity for accommodating the elastic body 2, the slider 3, the pin 4 and the secondary glasses leg 5 is provided at the tail of the main glasses leg 1. The elastic body 2, the slider 3, the pin 4 and the secondary glasses leg 5 are partially or entirely arranged in the cavity of the main glasses leg.

The slider 3 is in a "T" shape, wherein a reference numeral 31 designates a butt block in the shape of teeth, and a reference numeral 32 designates a core bar which is a cylinder. The elastic body 2 is sleeved on the core bar 32 of the "T"-shaped slider. The top end 51 of the secondary glasses leg 5 is in the form of half of a gear, and the two sides 52 (the other side is not shown in the figure below) are planar.

The elastic body 2, the slider 3, the pin 4 and the secondary glasses leg 5 are each arranged at their proper positions in the cavity. The pin 4 passes through corresponding holes of the main glasses leg 1 and the secondary glasses leg 5, forming a special glasses leg which allows the secondary glasses leg 5 to be bendable (rotatable) around the pin 4 in multiple angles and ready to return to the original position at any time.

Figure 3:
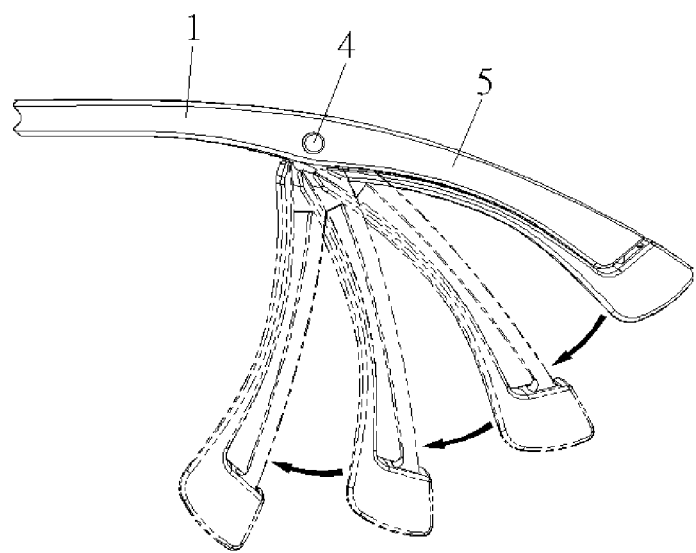
FIG. 3 is a schematic view of the profile of the first embodiment of the subject eyeglasses illustrating multiple leg angles.

FIG. 3 shows the profile of one of the embodiments of the eyeglasses having a glasses leg bendable in multiple angles and a variety of bending shapes of the secondary glasses legs 5.

Figure 4:
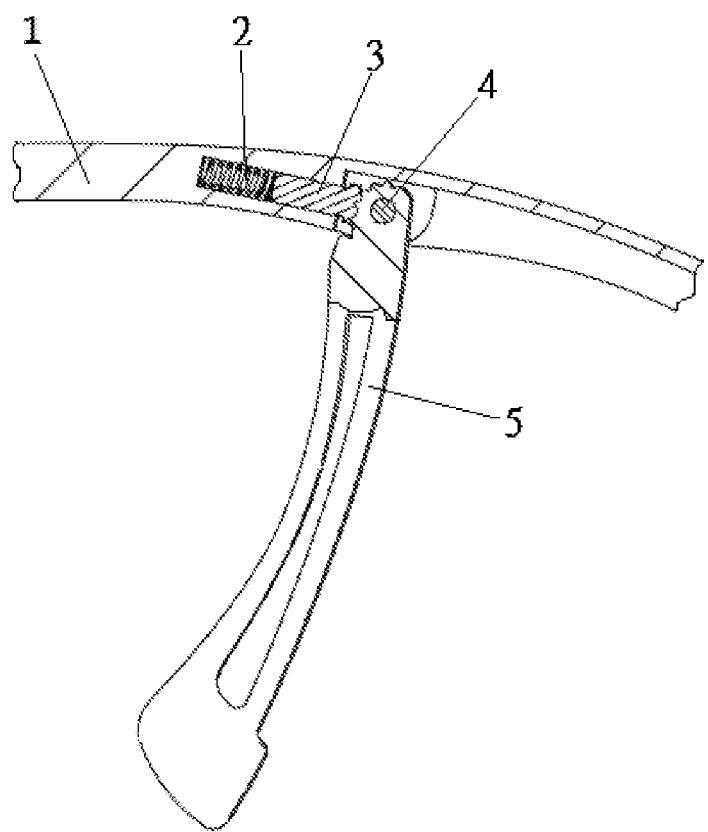
FIG. 4 is a schematic view of the internal structure of a second embodiment of the subject eyeglasses.

FIG. 4 shows the internal structure of a second embodiment, wherein the bar of the "T"-shaped slider 3 is thick, and the elastic body 2 (the elastic body of this embodiment is a spring) is provided behind the bar of the slider 3. In addition, the slider may also be provided in a rectangular shape, a circular shape, and a variety of other shapes with teeth.

Figure 5:
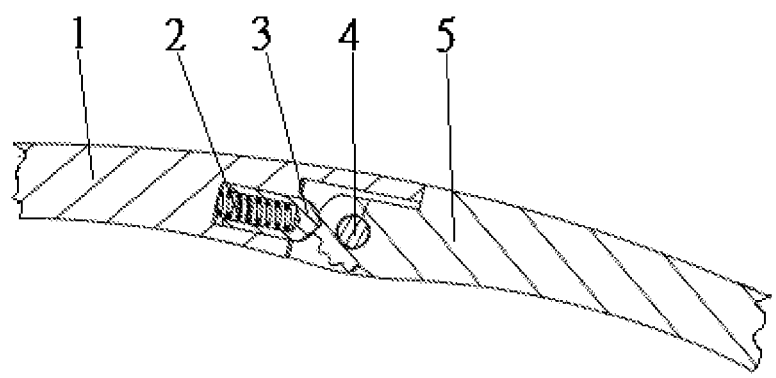
FIG. 5 is a schematic view of the internal structure of a third embodiment of the subject eyeglasses.

FIG. 5 shows the internal structure of a third embodiment, wherein the slider 3 is a hollow rectangular body. The elastic body 2 (the elastic body in this embodiment is a spring) is disposed within the hollow rectangular body. The main glasses leg and the secondary glasses leg are arranged in series.

It should be noted that the above-described embodiments are merely exemplary illustrations of the invention and are not used to limit the invention. A person having ordinary skill in the art may make equivalent changes, improvements and modifications to the invention without departing from its spirit and essence. Such equivalent changes, improvements and modifications are considered falling in the protection scope of the invention.

The invention claimed is:

1. Eyeglasses with legs bendable in multiple angles, comprising: a main glasses leg, a secondary glasses leg, and a connecting member connecting said main glasses leg and said secondary glasses leg, an elastic body and a slider biased by said elastic body and engageable with said secondary glasses leg, characterized in that the secondary glasses leg is hinged on a tail of the main glasses leg in such a manner that the opening angle is lockable, the tail of the main glasses leg defining a cavity for accommodating the elastic body and the slider is provided at the tail of the main glasses leg, and the slider and the secondary glasses leg are each provided with engagable teeth at a position where they abut against each other at a front portion of the secondary glasses leg and the slider defines a blind hole and the elastic body is provided in the blind hole.

2. The eyeglasses with legs bendable in multiple angles according to claim 1, characterized in that the secondary glasses leg is partially or entirely arranged in the cavity of the main glasses leg.

3. The eyeglass with legs bendable in multiple angles according to claim 2, characterized in that the teeth of the slider are single or multiple in number, and the slider has a shape selected from the group consisting of a "T" shape, a hollow rectangular body, a solid rectangular body, a cylinder and a polyhedron.

4. The eyeglasses with legs bendable in multiple angles according to claim 2, characterized in that the slider comprises a butt block whose top is provided with teeth and a core bar outside of which the elastic body is sleeved.

5. The eyeglasses with legs bendable in multiple angles according to claim 4, characterized in that the elastic body is provided behind the slider.

6. The eyeglasses with legs bendable in multiple angles according to claim 2, characterized in that the connecting member is a pin, a screw or a rivet.

7. The eyeglasses with legs bendable in multiple angles according to claim 2, characterized in that a hinge head is formed at a position where the secondary glasses leg and the main glasses leg abut against each other, said hinge head being a flat member and defining a hinge hole therein, and the top end surface of the hinge head is provided with teeth angularly disposed about said hinge hole, wherein the end surfaces at two sides of the hinge head are planar or curved surface approximating to a plane, in which a through hole perpendicular to the end surfaces at two sides of the hinge head is provided.

8. The eyeglasses with legs bendable in multiple angles according to claim 2, characterized in that the elastic body is a spring, an elastic plastic or rubber cylindrical article.

9. Eyeglasses with legs bendable in multiple angles, comprising: a main glasses leg, a secondary glasses leg, and a connecting member connecting said main glasses leg and said secondary glasses leg, an elastic body and a slider biased by said elastic body and engageable with said secondary glasses leg, characterized in that the secondary glasses leg is hinged on a tail of the main glasses leg in such a manner that the opening angle is lockable, the tail of the main glasses leg defining a cavity for accommodating the elastic body wherein the secondary glasses leg is partially or entirely arranged in the cavity of the main glasses leg and the slider is provided at the tail of the main glasses leg, and the slider comprises a butt block whose top is provided with teeth and a core bar outside of which the elastic body is sleeved and the secondary glasses leg are each provided with engagable teeth at a position where they abut against each other at a front portion of the secondary glasses leg and the slider defines a blind hole and the elastic body is provided in the blind hole.

\* \* \* \* \*